US009015320B2

(12) United States Patent
Rice et al.

(10) Patent No.: US 9,015,320 B2
(45) Date of Patent: Apr. 21, 2015

(54) DYNAMIC PROVISIONING OF SERVICE REQUESTS

(75) Inventors: Joseph Allen Rice, Ballston Lake, NY (US); Brandon Matthew Castagna, Mount Holly, NC (US)

(73) Assignee: Bank of America Corporation, Charlotte, NC (US)

( * ) Notice: Subject to any disclaimer, the term of this patent is extended or adjusted under 35 U.S.C. 154(b) by 242 days.

(21) Appl. No.: 13/181,141

(22) Filed: Jul. 12, 2011

(65) Prior Publication Data
US 2013/0019013 A1    Jan. 17, 2013

(51) Int. Cl.
*G06F 15/173* (2006.01)
*G06F 9/50* (2006.01)
*H04L 29/12* (2006.01)
*H04L 29/08* (2006.01)

(52) U.S. Cl.
CPC .......... *G06F 9/5055* (2013.01); *H04L 61/1511* (2013.01); *H04L 61/1523* (2013.01); *H04L 67/1029* (2013.01)

(58) Field of Classification Search
USPC ....................................................... 709/225
See application file for complete search history.

(56) References Cited

U.S. PATENT DOCUMENTS

| | | | |
|---|---|---|---|
| 7,418,457 B2 * | 8/2008 | Kaler et al. ............................ 1/1 |
| 7,451,157 B2 * | 11/2008 | Kaler et al. ............................ 1/1 |
| 7,721,322 B2 | 5/2010 | Sastry et al. |
| 7,930,214 B2 * | 4/2011 | Knauerhase et al. ........ 705/26.1 |
| 7,957,994 B2 | 6/2011 | Brown et al. |
| 7,979,379 B2 | 7/2011 | Voegele et al. |
| 7,979,554 B2 | 7/2011 | Ho et al. |
| 7,984,096 B2 | 7/2011 | Beoughter et al. |
| 8,020,051 B2 | 9/2011 | Ziegler |
| 8,041,760 B2 | 10/2011 | Mamou et al. |
| 8,051,430 B2 | 11/2011 | Rapp |
| 8,060,553 B2 | 11/2011 | Mamou et al. |
| 8,069,057 B2 | 11/2011 | Choubey et al. |
| 8,090,831 B2 | 1/2012 | Brauel et al. |
| 8,135,785 B2 | 3/2012 | Malladi et al. |
| 8,140,582 B2 | 3/2012 | Chen et al. |
| 8,140,615 B2 | 3/2012 | Miller et al. |
| 8,141,151 B2 | 3/2012 | Hunt et al. |
| 8,146,099 B2 | 3/2012 | Tkatch et al. |
| 8,156,140 B2 | 4/2012 | Roshen et al. |
| 8,156,179 B2 | 4/2012 | Parmar et al. |
| 8,161,500 B2 | 4/2012 | Tan et al. |
| 8,183,994 B2 | 5/2012 | Staab |
| 8,195,803 B2 | 6/2012 | Zhang et al. |
| 8,196,145 B2 | 6/2012 | Miller et al. |
| 8,370,312 B1 * | 2/2013 | Sawhney et al. .............. 707/694 |
| 2001/0011250 A1 | 8/2001 | Paltenghe et al. |
| 2002/0178254 A1 * | 11/2002 | Brittenham et al. .......... 709/224 |
| 2002/0188513 A1 | 12/2002 | Gil et al. |
| 2003/0074367 A1 * | 4/2003 | Kaler et al. ................... 707/102 |
| 2004/0236633 A1 * | 11/2004 | Knauerhase et al. ........... 705/26 |
| 2005/0177602 A1 * | 8/2005 | Kaler et al. ................. 707/104.1 |
| 2006/0020646 A1 * | 1/2006 | Tee et al. ........................ 707/205 |
| 2006/0041669 A1 | 2/2006 | Bemmel et al. |
| 2006/0123472 A1 | 6/2006 | Schmidt et al. |
| 2006/0282660 A1 | 12/2006 | Varghese et al. |
| 2007/0118878 A1 | 5/2007 | Sastry et al. |
| 2008/0046335 A1 * | 2/2008 | Zhou ................................ 705/26 |
| 2009/0070478 A1 | 3/2009 | Herman et al. |
| 2010/0023491 A1 * | 1/2010 | Huang et al. ...................... 707/3 |
| 2010/0333111 A1 * | 12/2010 | Kothamasu et al. .......... 719/313 |
| 2011/0231921 A1 | 9/2011 | Narayanan et al. |
| 2011/0264865 A1 | 10/2011 | Mobarak et al. |
| 2012/0110199 A1 | 5/2012 | Mao et al. |

FOREIGN PATENT DOCUMENTS

WO        2012073027 A2    6/2012

OTHER PUBLICATIONS

ISR & WO mailed Sep. 27, 2012 from PCT Application PCT/US12/45164.
Ludwig et al., "Catalog-based service request management", IMB Systems Journal, vol. 46, N. 3, Dec. 2007 (retrieved on Sep. 4, 2012), Retrieved from the Internet http://citeseerx.ist.psu.edu.
Giordano, DNS-Based Discovery System in Service Oriented Programming, Advances in Grid Computing—EGC 2005, pp. 840-850, Springer-Verlag Berlin Heidelberg.
Callaway, An Autonomic Service Delivery Platform for Service-Oriented Network Environments, Nov. 7, 2007, pp. 1-70, PhD Preliminary Examination, Department of Electrical and Computer Engineering, North Carolina State University.
Notice of Allowance dated Mar. 1, 2013 from U.S. Appl. No. 13/181,151.
Office Action dated Mar. 11, 2013 from U.S. Appl. No. 13/181,145.
International Search Report dated Aug. 28, 2013 in International Application No. PCT/US2013/046749.
U.S. Final Office Action dated Aug. 28, 2013 in U.S. Appl. No. 13/181,145.

* cited by examiner

*Primary Examiner* — Brian P Whipple
(74) *Attorney, Agent, or Firm* — Banner & Witcoff, Ltd.; Michael A. Springs (57) ABSTRACT

An enhanced service DNS server may receive service requests and interface with an integrated metadata repository/policy definition server to determine service policies associated with the service request. The service policies may aid the enhanced service DNS server in determining if a requestor associated with the service is authorized to receive the service and if the service requestor is authorized to receive the service, the service policies may detail how the enhanced service DNS server may route the service request to the appropriate service provider over the network. This scheme may help to automate the process of implementing changes to services provided over a network.

20 Claims, 3 Drawing Sheets

DYNAMIC PROVISIONING OF SERVICE REQUESTS

CROSS REFERENCE TO RELATED APPLICATIONS

This application is related to U.S. application Ser. No. 13/181,145 and U.S. application Ser. No. 13/181,151, which were filed concurrently with this application and which are herein incorporated by reference in their entirety.

TECHNICAL FIELD

Aspects of the invention generally relate to ways in which an entity may dynamically assign routing mechanisms for service requests. In particular, an enhanced service domain name system (DNS) server may interface with a metadata repository and/or policy definition server to determine an appropriate network route for a requested resource.

BACKGROUND

Conventional domain name systems (DNS) are configured to include static, hard-wired definitions of how domain names are translated into Internet Protocol (IP) addresses. Moreover, multiple services are grouped together behind a domain name (e.g., uniform resource locator (URL), and the like) in a way that is not agile and secure.

For instance, in conventional systems, a user requests a URL by routing a request to an appropriate network bus; the network bus then routes the request to a provider of the requested URL (e.g., a web page server). When changes are made to how servers can access services that undergird these URLs (e.g., from one URL to another) or when new services come online, static definitions within the DNS server of how URLs are translated into IP addresses must be manually changed or added, which can be an error-prone, time-consuming, and expensive process. In addition, in conventional private networks, manual intervention may be required for a host of situations, including opening up a firewall rule, creating a load balancer rule, and/or inserting a piece of middleware to route services to a particular destination, and the like.

Moreover, while users may request a given URL and may navigate through the URL to access a desired service, a user may not be able to directly access the service itself. The circuitous process of accessing desired services in conventional networks may lead to end-user frustration.

Thus, there is a need for new strategies for requesting access to services and routing these service requests to the appropriate destination.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, non-transitory computer readable media, and apparatuses for allowing an enhanced service domain name system (DNS) server to route service requests to the appropriate destination. The enhanced service DNS server may perform these functions by accessing service policy information stored within an integrated metadata repository and/or policy definition server.

Other aspects of the disclosure relate to an enhanced service DNS server that interfaces with an integrated metadata repository in real-time, as the service request is made, and dynamically retrieves the appropriate routing mechanism for the requested resource at the time the service request is made.

Other aspects of the disclosure relate to the implementation of changes in service policies without manually changing the hard-wired definitions stored in an array of DNS servers; instead, these changes may be effectuated by changing policy definitions within a single metadata repository and/or policy definition server.

Aspects of the disclosure may be provided in a computer-readable medium having computer-executable instructions to perform one or more of the process steps described herein.

BRIEF DESCRIPTION OF THE DRAWINGS

The present invention is illustrated by way of example and is not limited in the accompanying figures in which like reference numerals indicate similar elements and in which.

DETAILED DESCRIPTION

As discussed above, entities such as companies, governmental agencies, universities, and the like struggle with the time and expense associated with making changes and/or additions to services provided by the network maintained by the entity. Therefore, there is a need for new systems and methodologies for implementing service changes within a network.

Figure 1:
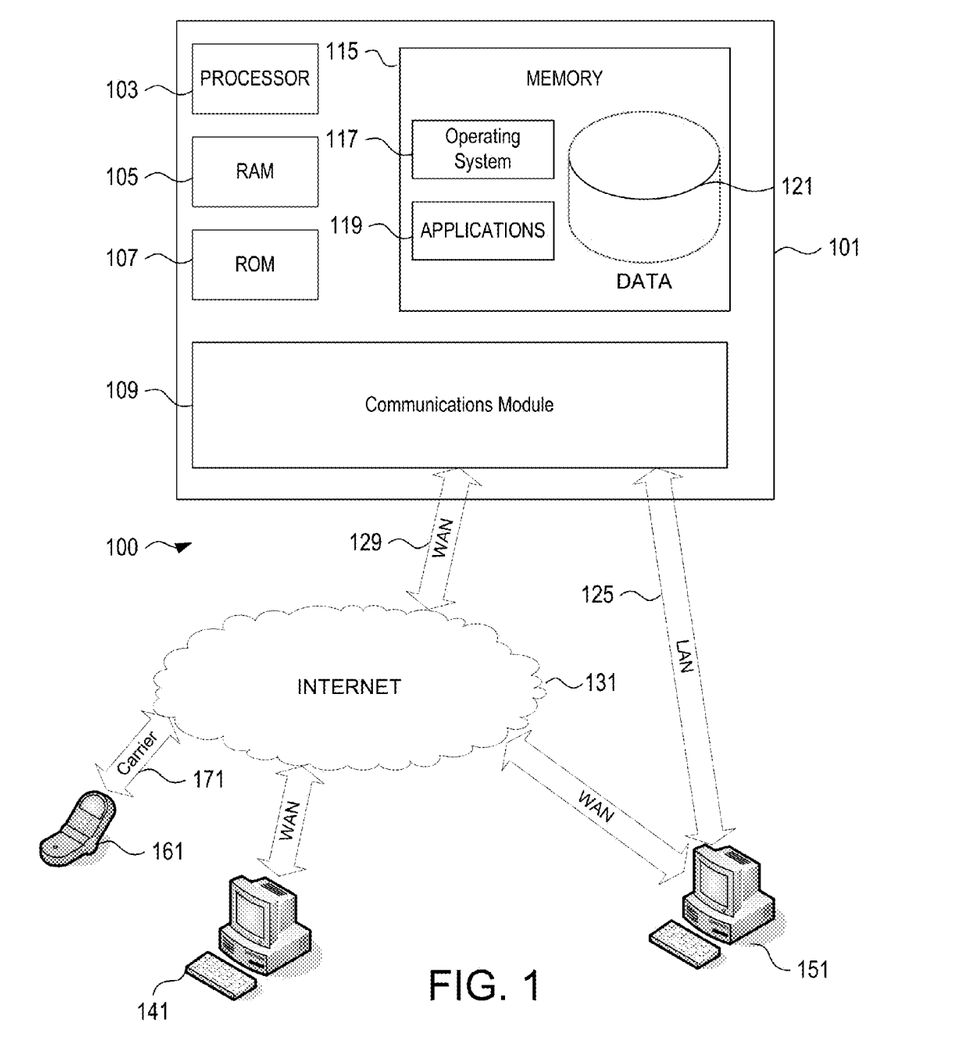
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include an enhanced service domain name server (DNS) 101 wherein the processes discussed herein may be implemented. The enhanced service DNS server 101 may have a processor 103 for controlling overall operation of the enhanced service DNS server 101 and its associated components, including random-access memory (RAM) 105, read-only memory (ROM) 107, communications module 109, and memory 115. Processor 103 and its associated components may allow the enhanced service DNS server 101 to run a series of computer-readable instructions related to dynamic translation of service requests into service addresses. Processor 103 may also direct enhanced service DNS server 101 to access service policy information within an integrated metadata repository.

Enhanced service DNS server 101 typically includes a variety of computer readable media. Computer readable media may be any available media that may be accessed by enhanced service DNS server 101 and include both volatile and nonvolatile media, removable and non-removable media. By way of example, and not limitation, computer-readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by enhanced service DNS server 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts, and the like to digital files.

Although not shown, RAM 105 may include one or more are applications representing the application data stored in RAM 105 while the enhanced service DNS server 101 is on and corresponding software applications (e.g., software tasks) are running on the enhanced service DNS server 101.

Communications module 109 may include a microphone, keypad, touch screen, and/or stylus through which a user of enhanced service DNS server 101 may provide input, and may also include one or more of a speaker for providing audio output and a video display device for providing textual, audiovisual and/or graphical output.

Software may be stored within memory 115 and/or storage to provide instructions to processor 103 for enabling enhanced service DNS server 101 to perform various functions. For example, memory 115 may store software used by the enhanced service DNS server 101, such as an operating system 117, application programs 119, and an associated database 121. Also, some or all of the computer executable instructions for enhanced service DNS server 101 may be embodied in hardware or firmware.

Enhanced service DNS server 101 may operate in a networked environment supporting connections to one or more remote computing devices, such as computing devices 141, 151, and 161. The computing devices 141, 151, and 161 may be personal computing devices or servers that include many or all of the elements described above relative to the enhanced service DNS server 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, enhanced service DNS server 101 may be connected to the LAN 125 through a network interface or adapter in the communications module 109. When used in a WAN networking environment, the enhanced service DNS server 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server configuration to permit a user to retrieve web pages from a web-based server. Any of various conventional web browsers can be used to display and manipulate data on web pages.

Additionally, one or more application programs 119 used by the enhanced service DNS server 101, according to an illustrative embodiment, may include computer executable instructions for invoking user functionality related to communication including, for example, email, short message service (SMS), and voice input and speech recognition applications (e.g., for transmitting service policy information and/or receiving service request information, and the like). In addition, the application programs 119 may include computer executable instructions for invoking functionality related to dynamically assigning a service address for a given service request.

Embodiments of the disclosure may include forms of computer-readable media. Computer-readable media include any available media that can be accessed by an enhanced service DNS server 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor 103 on enhanced service DNS server 101. Such a processor may execute computer-executable instructions stored on a computer-readable medium.

Figure 2:
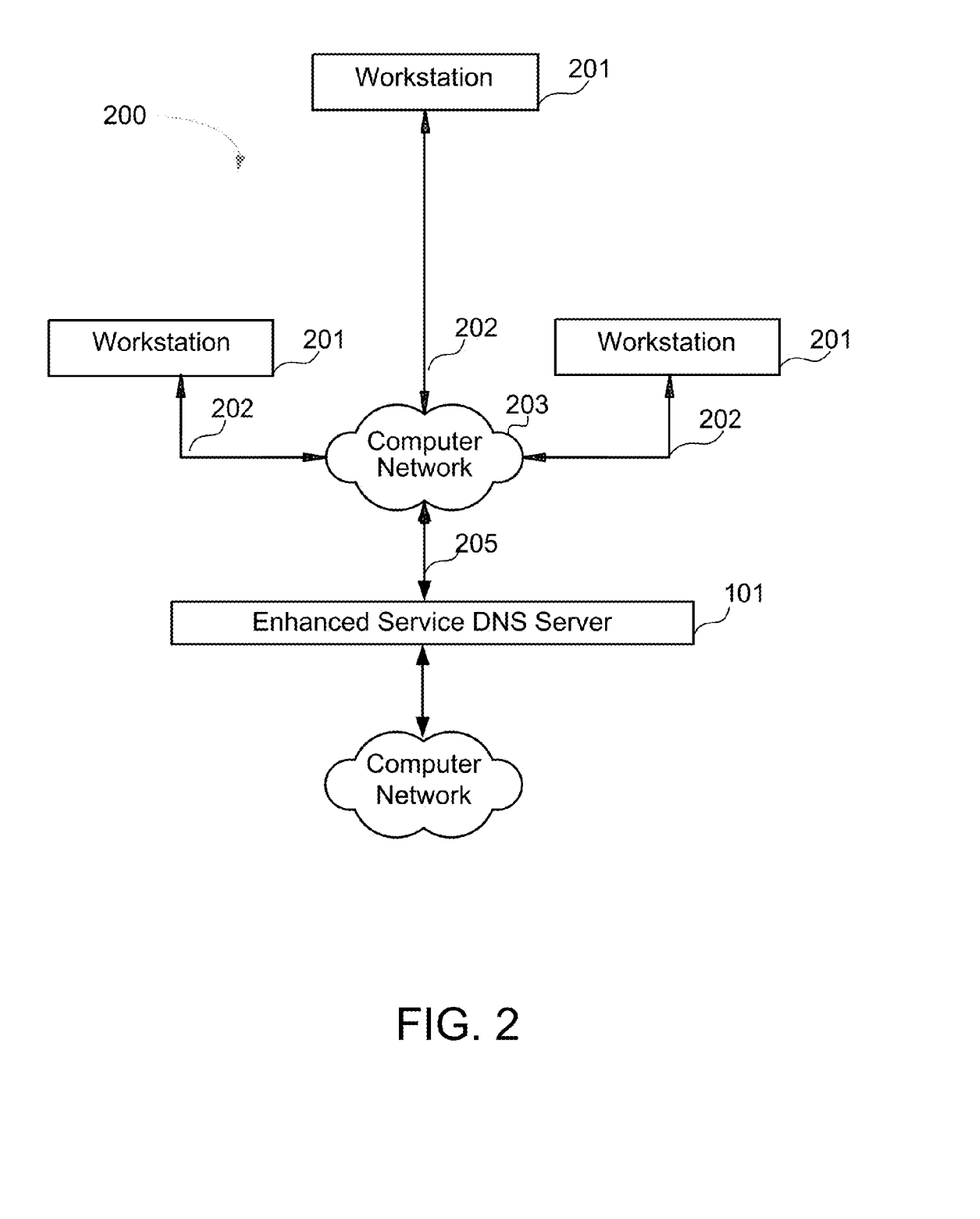
FIG. 2 is an illustrative block diagram of workstations and servers that may be used to implement the processes and functions of one or more aspects of the present disclosure.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to enhanced service DNS server 101. Workstations 201 may include many of the same hardware/software components as enhanced service DNS server 101. In some embodiments, workstations 201 may represent data stores (e.g., a policy definition server and/or integrated metadata repository) for storing service policy data accessed and used by enhanced service DNS server 101. In other embodiments, workstations 201 may represent various user terminals for accessing enhanced service DNS server 101. In system 200, enhanced service DNS server 101 may be any suitable server, processor, computer, or data processing device, or combination of the same. Enhanced service DNS server 101 may be used to process the instructions received from one or more users.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and enhanced service DNS server 101, such as network links, dial-up links, wireless links, hard-wired links, and the like.

The steps that follow in the Figures may be implemented by one or more of the components in FIGS. 1 and 2 and/or other components, including other computing devices.

In accordance with various aspects of the disclosure, methods, computer-readable media, and apparatuses are disclosed that allow an entity, such as a company, government agency, university, and the like, to implement advanced methodologies for dynamically assigning network routes to service requests.

According to an illustrative aspect, to implement the network solution, an entity (e.g., a corporation) may use an enhanced service DNS server 101 configured to run computer-executable program instructions related to each step of the service request routing process. In particular, the enhanced service DNS server 101 may resolve a service URL (e.g., the URL of a service provider) into a service address of a service provider for the service URL. For example, a service URL for accessing sports content may be "sports," meaning that a user may access a preferred service provider for sports content within a private network by typing in the word "sports" into a browser. Similarly, the service URL for accessing the latest news content may be "news," and the service URL for accessing the latest weather information may be "weather." One of ordinary skill in the art would recognize that alternative naming conventions may be used to designate a service URL.

In general, a service request may represent a higher order construct that specifies a desired resource. For instance, if a user initiates a service request for "sports," the enhanced service DNS server 101 may access policy definition metadata stored on an integrated metadata repository and/or policy definition server that specifies a particular sports content provider. If the same user initiates this service request at a later date, the policy definition metadata for this service request may have changed during the interim; if so, the enhanced service DNS server 101 may access policy definition metadata that specifies that the service request for "sports" should be routed to a different sports content provider.

As another example, if the entity implementing the enhanced service DNS server 101 is a financial organization (e.g., a bank), servers within the bank's network may receive a variety of service requests from a bank employee on behalf of a bank customer, including those related to opening a new bank account, registering for a credit card, applying for a loan, and the like.

In some aspects, a department or group (e.g., an enterprise architecture group, and the like.) within an entity such as a corporation may be responsible for dynamically configuring metadata and policy definitions undergirding the metadata. This group may decide to make changes to policy definitions and the metadata for a number of reasons, including those related to new services that need to be accommodated, a change in the quality of a service offered by a service provider, lack of availability of a service provider at the time that the service is requested, and a change in the cost of the service offered by the service provider, among other things.

The service request may initially be routed to the enhanced service DNS server 101 to determine the appropriate routing mechanism for the service request. In assigning the appropriate routing mechanism, the bank may access service policy information in a metadata repository, which may either be integrated with the enhanced service DNS server 101 or a standalone storage device.

In some embodiments, the enhanced service DNS server 101 may access information about standardized service policies both from an integrated metadata repository and/or a policy definition server. By accessing the metadata stored in the integrated metadata repository and/or policy definitions within a policy definition server, the enhanced service DNS server 101 may automate the process of configuring network elements to handle service requests across an entity such as a corporation. In other embodiments, both the integrated metadata repository and the policy definition server may be merged into one storage device. In certain aspects, the policy definition server and/or integrated metadata repository may be known as a service repository, which is configured to store and publish standardized information about services so that they are discoverable by users of a private network.

The integrated metadata repository and the policy definition server may store data related to operational (e.g., runtime) policies such as those relating to entitlement, routing, work load management, logging, protocol bridging, format translation, filtering, and/or business process management, among other things. Policies related to entitlement may include details on security functions such as authentication (e.g., establishing identity through a credential), authorization (e.g., determining if access is authorized for a privileged resource), and auditing of services and/or service requests. Policies related to routing may define how to decide where to route a given service request or a response to a service request (e.g., DNS/QUEUE resolution, site selection, content or context based routing, and the like).

For instance, using a fixed address to access a service (via an IP address, server name, service bus URL or queue name), may create undesired coupling between the service consumer and the physical instance of the service or an intermediary such as a service bus or middleware processing node or segment. Due to this coupling, any change in the physical layer or migrations to new servers (such as promotion along a test pipeline to production) may create the need for software changes and introduces a barrier to agility. Partial solutions (such as Universal Description, Discovery and Integration (UDDI)) create a runtime service lookup to decouple the logical use from the physical implementation. This implementation enables the needed virtualization, because service addressing uses outside facilities to allow adjusting addresses without touching the service, whether from the consumer/request or within an integration bus. But conventional implementations require changes to every application to look-up endpoints in a custom way (via UDDI or other non-standard means) and adjust the address being called, creating a barrier to adoption.

In accordance with certain aspects of the disclosure, an approach which eliminates both agility and adoption barriers is to embed the service name itself or service basket string as the path identifier using a standard method where no client application coding is required. This implementation is possible by extending the standard DNS to reference the service name and then extend the centralized DNS look-up mechanism to access any dynamic end-point information associated with that service name stored in either Lightweight Directory Access Protocol (LDAP) or repository form. This method may be applied to any protocol, such as HTTPS.

Traditional DNS would simply return a virtual IP address from a static pool of addresses. The enhanced service DNS server 101 may instead return a dynamic address selected from a dynamic pool of virtual IPs that were associated with that service URL via an LDAP lookup or repository query. For greater performance and reliability, the VIP pool for each service URL may be cached local in the enhanced server DNS server 101 and refreshed periodically.

The dynamic nature and real-time update capabilities for the first hop from client (service requestor) to service node eliminates some potential for transaction failure (by eliminating manual configuration). This implementation may also open the door to context-driven routing to the best available servicing node (e.g., a service router or service gateway) or to the lowest cost or performance or availability-optimized end-point or servicer.

In certain aspects, an example of context-based routing or decisioning, triggered by a run-time context, includes cost/performance-based routing (based on comparative costs per transaction and availability to lower-cost cloud computing versus higher cost and more resilient internal services on an entity controlled network). In this example, a service request may be routed in a network based on the lowest cost provider that meets the minimum availability and performance service level agreements (SLAs) for each request type. Another example of context-based routing or decisioning, triggered by a run-time context, includes value-based service level management, where the business value (transaction amount or business impact of failure) for each transaction type (or service request type) may be coded as metadata in a service repository and is used to determine which transactions (or requests) may be guaranteed processing and which may be throttled or redirected when resources become constrained or demand exceeds rated capacity. Yet another example of context-based routing or decisioning, triggered by a run-time context, includes resource-based timing, where the amount of resources (e.g., threads, memory, connections, time-out values, and the like) may be allocated based on granular measurements of available resources by provider and service type. A final example of context-based routing or decisioning, triggered by a run-time context may include the use of alternate path triggers. In this example, when virtual machine work-load management is configured, a service gateway may determine that only some traffic may be served using dynamic content (from the active service provider virtual machine instances). Service gateways may then route excess traffic to alternate internal service providers or adjust cache parameters in the message response header to trigger service of some requests via cached content that is still relevant but aged to a greater degree until demand subsides or additional dynamic service providers become available or more responsive.

In general, the ability of a service repository to define significant triggers (driven by environment or run-time context) and to render resultant actions in a common way (e.g., XML) which may be acted upon by a diverse set of vendor tools throughout the network or even across multiple divisional or corporate boundaries may represent a breakthrough extension of federated connectivity and service management.

With the advent of cloud computing, where emerging low cost service providers or end-points may use dynamic IP addressing, a solution like the enhanced service DNS server 101 may be a key enabler for both agility and cost reduction. Likewise, the ability to dynamically provision end-to-end services and connectivity flows in a fully metadata-driven fashion may enable real-time deployment of new infrastructure, including dev-on-demand and other on-demand paradigms.

Policies related to work-load management may include information on how many network components may participate in responding to a service request (connection distribution, local load balancing, Virtual Machine (VM) level work-load management (WLM), and the like). Policies related to logging may include information on when to log data (e.g., when a service request is made to measure performance metrics of the network such as the amount of time that the network takes to fulfill the service request, when access to a privileged network resource is granted or denied, when deceptive acts are committed on the network, and the like.)

Policies related to protocol bridging may include information on how to change data from one format to another format (e.g., to allow one application to communicate with another). Policies related to format translation may include information related to editing data to make the data suitable for use in a given application (e.g., changing a double quotes to a single quote within a message, and the like). Policies related to filtering may define techniques (e.g., via style sheet filters, and the like) to strip away information that is not needed in a service transaction. For instance, if a network is providing a service related to obtaining a credit card, a filtering policy may specify that sensitive information such as the social security number of the service requestor be removed from the service request before transmitting the service request to a company that prints credit cards. Finally, policies related business process management may specify how complicated service requests may be divided into sub-requests. In some embodiments, business process management policies may describe orchestration of discrete services into a composite service.

In a typical multinational firm or federated enterprise that spans many large divisions, there may be multiple distributed information repositories. Each may use a different vendor solution for storing and managing services or integration flows or connections. By including an integrated metadata repository, system 200 may have the flexibility to store and manage service or connectivity-related metadata (such as service or operation names, Web Services Description Language (WSDL) or interface details, authentication credentials, authorization credentials, authorization contracts or entitlements (either at the user or system level), triggers for actions such as logging, service level management and throttling, and multi-factor content-based routing, end-point and load balancer details, transformation and orchestration logic or rules, service-bus or segment mapping or other decisioning criteria) across this flexible array of departmental or divisional repositories while still being able to federate into a common repository that can normalize the information via a common application programming interface (API) or file interface specification and translate the enterprise view of the design-time data into run-time flows, routes or policies that can be enforced or executed in real-time as part of the cross-vendor service mediation framework (potentially interfacing to off-premise resources or entities via a virtual private internet connectivity.)

As an example, assume that a multi-division bank stores web service information in each division using division specific repositories. In this example, division A may use a first commercially available repository, division B may use a second commercially available repository, division C may use a home grown repository, and division D may use a third commercially available repository. All of this service metadata may be integrated/imported using a common repository with a common interface or file format (e.g., a common API). This federated data may drive enterprise level reports showing holistic cross-divisional service interactions. The enterprise metadata may be used to create XML-formatted control files that enable any node of the network (comprising a vast array of diverse vendor tools configured to act as service mediation framework components such as service routers or service gateways). This implementation may transform what used to be thousands of independent and uncoordinated vendor point solutions into a grid of interconnected and highly integrated common components that respond to centrally managed instructions or policies.

A common set of policies can be described via various tools and ultimately stored in open formats such as a common XML format to describe run-time policy statements. The enterprise repository may manage this combination of enterprise service metadata and enterprise policies to control and manage connectivity, security, failover, route-away, logging, transformation and translation, orchestration and context based decisioning. The run-time context (real-time performance, cost, availability, quality-of-service (QOS), run-time characteristics such as resource usage and availability) may be measured and fed-back or made available to any node of the service mediation framework or to the enterprise repository itself to enable situation specific actions (context aware decisions).

Examples of the types of metadata stored in an integrated metadata repository may include the name of a given service request, the network route that needs to be taken to reach a service provider for each service request, logging information related to the service request, the expected amount of time for getting a response to the service request, and the like. In general, metadata may include any piece of information that defines the interaction between a service requestor and a service provider, determines the route that a service request must take to get to a service provider, and/or authenticates or authorizes a service request. The policy definition server may store a separate copy of all the information within the integrated metadata repository and additional data, including a list of common functions for a given service and/or the policies that guide the use of these functions. The policy definition server and/or the integrated metadata repository may export a file in a standardized format (e.g., Extensible Markup Language (XML)) that any element (e.g., server) may process. The exported file may include information that allows the servers within a network to communicate about services via common protocols.

In certain aspects, the policy definition server and/or integrated metadata repository may define enough policies and metadata to cover all or a vast majority of all of the interaction points within an entity such as an organization. In some embodiments, the policy definition server and/or integrated metadata repository may export the policy information for service requests in a standard way. The data stored in and transmitted by the integrated metadata repository, the policy definition server, and/or the enhanced service DNS server 101 may be in a variety of formats, including XML.

In this way, if an organization (e.g., a financial institution, and the like) adds a new feature that depends on a web service to its corporate network, the wait time for integrating the new feature to the corporate network may be reduced drastically. Thus, potential delays to market share that depend on this new feature may also likewise be reduced.

Figure 3:
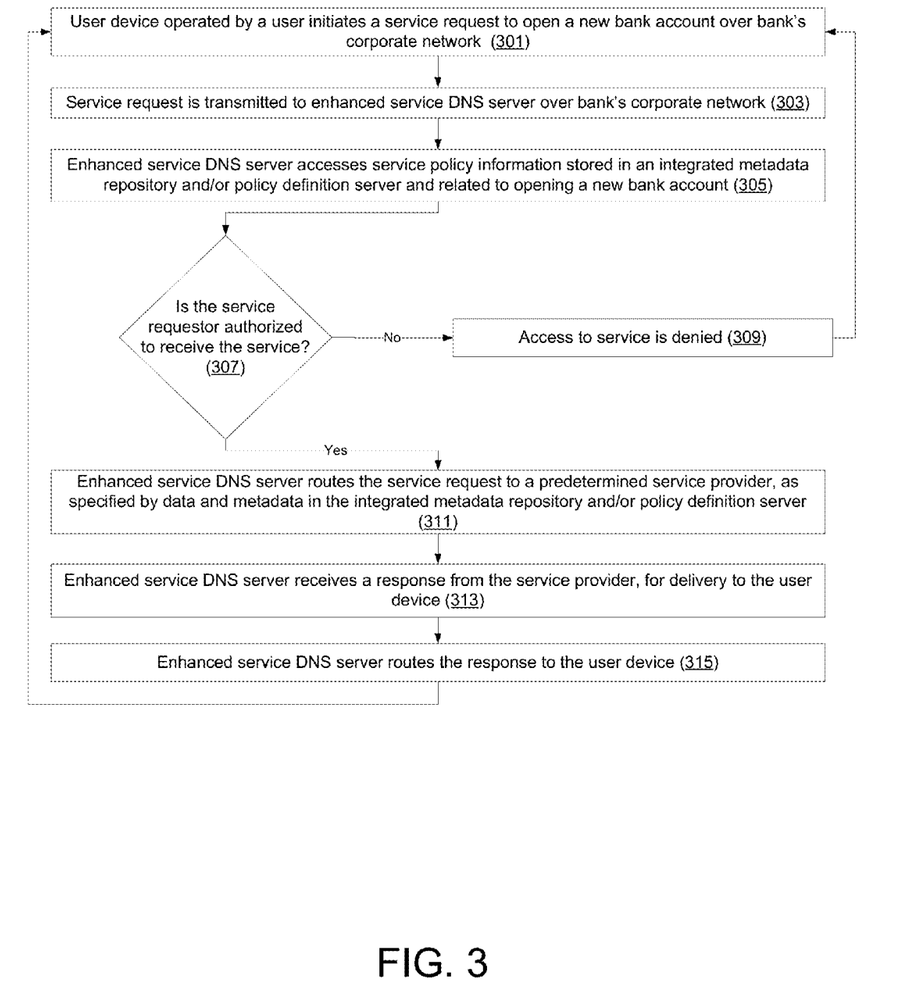
FIG. 3 is a flow diagram of steps performed by a service request routing process in accordance with one or more aspects of the disclosure.

FIG. 3 shows a flow diagram of a service request routing process implemented by enhanced service DNS server 101, in accordance with at least one aspect of the disclosure. The process shown in FIG. 3 may start out at step 301 where a user (e.g., a bank employee) operating a user device (e.g., a laptop) within a financial organization (e.g., bank) initiates a service request to open a new bank account over the bank's internal corporate network. The process may then move to step 303 where the request may be transmitted to the enhanced service DNS server 101 within the bank's computer network.

Next, in step 305, the enhanced service DNS server 101 may access service policies related to opening a new bank account from the integrated metadata repository and/or the policy definition server. For instance, these service policies may detail how service requests for opening a new bank account are routed to a service provider (e.g., a server handling new accounts, and the like). Relevant service policies accessed may also detail whether or not the service requestor is authorized to receive this service. The enhanced service DNS server 101 may also access any number of other service policies related to opening a new bank account, including those related to work-load management, the generation of performance and/or access logs, protocol bridging, format translation, filtering, and business process management.

Based on the entitlement policies accessed in step 305, the enhanced service DNS server 101 may determine if the service requestor is authorized to open a new bank account in step 307. If the service requestor is not authorized to receive the service, the process may move to step 309 where access to the service is denied. In this case, the process may move back up to step 301 where the process may restart when a new service request is made.

If the service requestor is authorized to receive the service, the process may move to step 311 where the enhanced service DNS server 101 may route the service request to the appropriate service provider (as determined by the routing policies accessed from the integrated metadata repository and/or policy definition server) for opening a new bank account. The data transmitted to the service provider may also include any other relevant information related to the service request, such as any of the other policy information accessed by the enhanced service DNS server 101 in step 305.

Next, the process may move to step 313 where the enhanced service DNS server 101 may receive a response from a server configured to handle requests for new bank accounts. This response may include a new bank account number, the minimum balance associated with the account, access authorization credentials for the account, and any number of other pieces of information. Once the enhanced service DNS server 101 receives this information, server 101 may transmit the response to the service requestor in step 315. In some embodiments, the enhanced service DNS server 101 may have to contact the integrated metadata repository and/or policy definition server to route the response back to the requestor; in other embodiments, the enhanced service DNS server 101 may store the routing mechanism to the service requestor in an internal memory when the initial service request is made.

If the same user or a different user decides at a later time that another service request to open a new bank account must be made, the enhanced service DNS server 101 may contact the integrated metadata repository and/or policy definition server to determine if any changes have been made to the metadata/data governing any of the policies (e.g., routing, and the like) related to the service request. If no changes have been made to the relevant service policies, the enhanced service DNS server 101 may handle the second service request in the same fashion as before. On the other hand, if changes have been made to the relevant service policies, the enhanced service DNS server 101 may automatically update the way that the new service request is fulfilled. For instance, if a new routing policy is specified for satisfying the service request, the enhanced service DNS server 101 may route the service request to a new server.

Using this process, the name of a service (rather than just a URL) may be requested and the enhanced service DNS server 101 may be configured to access information to determine the appropriate routing mechanism for the service request. By using the enhanced service DNS server 101, any modifications to service policies may be implemented by making a change within a single policy definition server rather than a collection of DNS servers. In this way, the routing of a service request to an appropriate destination may be driven by data for DNS rather than by a manual process.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A non-transitory computer-readable storage medium having computer-executable program instructions stored thereon that when executed by a processor, cause the processor to perform:
   receiving a service request associated with a service from a user device;
   accessing policy metadata related to the service request from an integrated metadata repository;
   analyzing the policy metadata to determine a plurality of policies related to the service request;
   determining an identity of a first service provider and dynamically routing the service request to the first service provider as determined by the plurality of policies accessed from the policy metadata;
   receiving a response to the service request from the service provider;
   transmitting the response to the user device; and
   wherein at a later time, receiving the service request from a user device, accessing the policy metadata related to the service request from the integrated metadata repository, analyzing the policy metadata to determine a plurality of policies related to the service request and routing the service request to a second service provider based on a change in the policy metadata.

2. The computer-readable storage medium of claim 1, wherein the integrated metadata repository stores the policy metadata in Extensible Markup Language (XML) format.

3. The computer-readable storage medium of claim 1, wherein the service request is chosen from the group consisting of: opening a bank account, registering for a credit card, and applying for a loan.

4. The computer-readable storage medium of claim 1, wherein the analyzing comprises determining if a service requestor making the service request is authorized to receive the service.

5. The computer-readable storage medium of claim 1, wherein the analyzing comprises: determining a service address of the first service provider for the service.

6. The computer-readable storage medium of claim 1, wherein the service request comprises a service uniform resource locator (URL).

7. The computer-readable storage medium of claim 1, wherein the policy metadata and the plurality of policies undergirding the policy metadata are dynamically configured for reasons chosen from the group consisting of: a new service is added to a network, a change in quality of the service provider, lack of availability of the service provider, a change in cost of the service provider.

8. The computer-readable storage medium of claim 1, wherein the plurality of policies are chosen from the group consisting of: entitlement policies, routing policies, workload management policies, logging policies, protocol bridging policies, format translation policies, filtering policies, and business process management policies.

9. The computer-readable storage medium of claim 1, wherein the policy metadata comprise a name associated with each type of service request, a network route for routing each type of service request to a corresponding service provider, logging information related to each type of service request, and an expected time for resolving each type of service request.

10. A computer-assisted method comprising:
    receiving a service request associated with a service from a user device through a communication module associated with the computer;
    requesting access to policy metadata related to the service request from an integrated metadata repository through the communication module;
    receiving an Extensible Markup Language (XML) file with the policy metadata;
    using a processor associated with the computer, analyzing the policy metadata in the XML file to determine a plurality of policies related to the service request;
    using the processor determining an identity of a first provider server and routing the service request to the first service provider server as determined by the plurality of policies accessed from the policy metadata;
    receiving a response to the service request from the first service provider server through the communication module;
    transmitting the response to the user device through the communication module; and
    wherein at a later time, receiving the service request from a user device, requesting access to policy metadata related to the service request from the integrated metadata repository, analyzing the policy metadata to determine a plurality of policies related to the service request and routing the service request to a second service provider based on a change in the policy metadata.

11. The computer-assisted method of claim 10, wherein the policy metadata includes information related to a service address to which the service request is to be routed.

12. The computer-assisted method of claim 10, wherein the policy metadata comprises information related to establishing an identity of a service requestor through an access credential supplied by the service requestor in the service request.

13. The computer-assisted method of claim 10, wherein the policy metadata comprises information related to how many network components will participate in responding to the service request.

14. The computer-assisted method of claim 10, wherein the policy metadata comprises information related to creation of access and performance logs for the service request.

15. The computer-assisted method of claim 10, wherein the policy metadata comprises information related to changing data associated with the service request from a first format to a second format.

16. An apparatus comprising:
a processor; and
a memory storing computer-readable instructions that, when executed by the processor, cause the processor to perform a method comprising:
receiving a plurality of service requests over a network;
accessing a plurality of policy metadata related to the plurality of service requests;
for a given service request:
analyzing at least some of the plurality of policy metadata to determine: (1) if a service requestor associated with the given service request is authorized to receive a service associated with the given service request and (2) when the service requestor associated with the given service request is authorized to receive the service, a first service address to which the given service request should be routed and an identity of a first service provider associated with the first service address;
when the service requestor associated with the given service request is authorized to receive the service, routing the given service request to the first service address;
receiving a response from the first service address;
transmitting the response to the service requestor; and
at a later date for the given service request analyzing at least some of the plurality of policy metadata to determine: a second service address to which the given service request should be routed and an identity of a second service provider associated with the second service address based on a change in the policy metadata.

17. The apparatus of claim 16, wherein the processor is further configured to: receive an Extensible Markup Language (XML) file including the plurality of policy metadata.

18. The apparatus of claim 16, wherein the network is a corporate network for a financial institution.

19. The apparatus of claim 16, wherein the plurality of policy metadata relate to entitlement, routing, and work-load management.

20. The apparatus of claim 16, wherein the given service request comprises a service uniform resource locator (URL).

\* \* \* \* \*